United States Patent
Nammi et al.

(10) Patent No.: US 11,296,854 B2
(45) Date of Patent: *Apr. 5, 2022

(54) FACILITATING A MOBILE DEVICE SPECIFIC PHYSICAL DOWNLINK SHARED CHANNEL RESOURCE ELEMENT MAPPING INDICATOR

(71) Applicant: AT&T Intellectual Property I, L.P., Atlanta, GA (US)

(72) Inventors: SaiRamesh Nammi, Austin, TX (US); Xiaoyi Wang, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 141 days.

This patent is subject to a terminal disclaimer.

(21) Appl. No.: 16/669,500

(22) Filed: Oct. 30, 2019

(65) Prior Publication Data
US 2020/0067686 A1 Feb. 27, 2020

Related U.S. Application Data

(63) Continuation of application No. 15/343,098, filed on Nov. 3, 2016, now Pat. No. 10,505,697.

(51) Int. Cl.
*H04L 5/00* (2006.01)
(52) U.S. Cl.
CPC .......... *H04L 5/0092* (2013.01); *H04L 5/0053* (2013.01)
(58) Field of Classification Search
CPC combination set(s) only.
See application file for complete search history.

(56) References Cited

U.S. PATENT DOCUMENTS 9,014,109 B2 4/2015 Gaur et al.
9,014,115 B2 4/2015 Gaur et al.
(Continued)

FOREIGN PATENT DOCUMENTS

CN 102457929 A1 5/2012
CN 107342852 A 11/2017
(Continued)

OTHER PUBLICATIONS

US 8,891,529 B2, 11/2014, Yue et al. (withdrawn)
(Continued)

*Primary Examiner* — Xavier S Wong
(74) *Attorney, Agent, or Firm* — Amin, Turocy & Watson, LLP

(57) ABSTRACT

A system employing RE mapping for efficient use of the downlink control channel is provided for a wireless communication system. In one example, the system operations can comprise selecting index information corresponding to a resource element mapping pattern of a group of resource element mapping patterns, wherein the group of resource element mapping patterns is associated with a mobile device of a group of mobile devices, wherein the resource element mapping pattern is a two-dimensional mapping pattern comprising associated control channel symbol locations on a first axis and associated subcarrier locations on a second axis, and wherein the index information is an index of a group of indices associated with respective ones of the group of resource element mapping patterns; and transmitting the index information to the mobile device to inform the mobile device of a control channel symbol location at which data can be transmitted.

20 Claims, 11 Drawing Sheets

(56) References Cited

U.S. PATENT DOCUMENTS

| | | | |
|---|---|---|---|
| 9,051,009 B2 | 6/2015 | Prohaska | |
| 9,094,145 B2 | 7/2015 | Yue et al. | |
| 9,130,725 B2 | 9/2015 | Gaal et al. | |
| 9,236,982 B2 | 1/2016 | Li et al. | |
| 9,391,805 B2 | 7/2016 | Wang et al. | |
| 9,398,572 B2* | 7/2016 | Zhu | H04L 47/283 |
| 9,425,934 B2 | 8/2016 | Seo et al. | |
| 9,635,658 B2 | 4/2017 | Papasakellariou et al. | |
| 9,699,589 B2 | 7/2017 | Novak et al. | |
| 9,750,887 B2 | 9/2017 | Hirschel et al. | |
| 9,780,766 B1 | 10/2017 | Feldtkeller | |
| 10,091,777 B1 | 10/2018 | Wang et al. | |
| 10,342,009 B2 | 7/2019 | Wang et al. | |
| 10,505,697 B2* | 12/2019 | Nammi | H04L 5/0053 |
| 10,652,880 B2* | 5/2020 | Wang | H04L 5/0094 |
| 2010/0091728 A1 | 4/2010 | Kim et al. | |
| 2010/0284363 A1* | 11/2010 | Ahn | H04B 7/12 370/330 |
| 2011/0103324 A1* | 5/2011 | Nam | H04B 7/0452 370/329 |
| 2011/0119568 A1 | 5/2011 | Jeong et al. | |
| 2011/0255631 A1 | 10/2011 | Pi | |
| 2013/0188531 A1 | 7/2013 | Zhang | |
| 2013/0195100 A1 | 8/2013 | Baker et al. | |
| 2013/0196675 A1 | 8/2013 | Xiao et al. | |
| 2013/0201926 A1 | 8/2013 | Nam et al. | |
| 2014/0003324 A1 | 1/2014 | Davydov et al. | |
| 2014/0177449 A1 | 6/2014 | Novak et al. | |
| 2014/0321369 A1 | 10/2014 | Davydov et al. | |
| 2014/0348077 A1 | 11/2014 | Clien et al. | |
| 2015/0004969 A1 | 1/2015 | Han et al. | |
| 2015/0092768 A1 | 4/2015 | Ng et al. | |
| 2015/0139197 A1 | 5/2015 | He et al. | |
| 2015/0207601 A1 | 7/2015 | Kim et al. | |
| 2015/0208366 A1 | 7/2015 | Papasakellariou et al. | |
| 2015/0223208 A1 | 8/2015 | Park et al. | |
| 2015/0296513 A1 | 10/2015 | Nogami et al. | |
| 2015/0327095 A1 | 11/2015 | Kwak et al. | |
| 2015/0365154 A1 | 12/2015 | Davydov et al. | |
| 2016/0036571 A1 | 2/2016 | Park et al. | |
| 2016/0112099 A1 | 4/2016 | Lee et al. | |
| 2016/0135143 A1 | 5/2016 | Won et al. | |
| 2016/0192388 A1 | 6/2016 | Ekpenyong et al. | |
| 2016/0192415 A1* | 6/2016 | Davydov | H04J 3/12 370/329 |
| 2016/0248561 A1 | 8/2016 | Davydov et al. | |
| 2016/0249244 A1 | 8/2016 | Xia et al. | |
| 2016/0270038 A1 | 9/2016 | Papasakellariou | |
| 2016/0270100 A1 | 9/2016 | Ng et al. | |
| 2017/0013605 A1 | 1/2017 | Li et al. | |
| 2017/0064678 A1 | 3/2017 | Park et al. | |
| 2017/0116552 A1 | 4/2017 | Deodhar et al. | |
| 2017/0164395 A1 | 6/2017 | Papasakellariou et al. | |
| 2017/0171690 A1 | 6/2017 | Kim et al. | |
| 2017/0223686 A1 | 8/2017 | You et al. | |
| 2017/0235848 A1 | 8/2017 | Van Dusen et al. | |
| 2017/0310435 A1 | 10/2017 | Wei et al. | |
| 2017/0325227 A1 | 11/2017 | Li et al. | |
| 2018/0048444 A1 | 2/2018 | Park et al. | |
| 2018/0070341 A1 | 3/2018 | Islam et al. | |
| 2018/0115965 A1 | 4/2018 | Takeda et al. | |
| 2019/0159209 A1 | 5/2019 | Xiao et al. | |

FOREIGN PATENT DOCUMENTS

| | | |
|---|---|---|
| WO | 2013070145 A1 | 5/2013 |
| WO | 2013096563 A1 | 6/2013 |
| WO | 2014051356 A1 | 4/2014 |
| WO | 2904521 A1 | 9/2014 |
| WO | 2014183302 A1 | 11/2014 |
| WO | 2016013744 A1 | 1/2016 |
| WO | 2016018079 A1 | 2/2016 |
| WO | 2016/074897 A1 | 5/2016 |
| WO | 2016070417 A1 | 5/2016 |
| WO | 2016072784 A1 | 5/2016 |
| WO | 20160078436 A1 | 7/2016 |
| WO | 2016133376 A1 | 8/2016 |
| WO | 2016182955 A1 | 11/2016 |
| WO | 2016208991 A1 | 12/2016 |
| WO | 2017022425 A1 | 2/2017 |
| WO | 2017023231 A1 | 2/2017 |
| WO | 2017031675 A1 | 3/2017 |
| WO | 2017050153 A1 | 3/2017 |
| WO | 2017050996 A1 | 3/2017 |
| WO | 2017095305 A1 | 6/2017 |
| WO | 2017095470 A1 | 6/2017 |

OTHER PUBLICATIONS

Notification of refusal received for Japanese Application Serial No. 2019-553865 dated Oct. 13, 2020, 5 Pages.
AT & T., "Signaling of forward compatible resources", 3GPP TSG RAN WG1 Meeting #88bis R1-1704355, Apr. 7, 2017, 3 pages.
AT & T., "Further details on forward compatible resouice in NR", 3GPP TSG RAN WG1 ad-hoc#2, R1-1710413, Jun. 27-30, 2017, 3 pages.
Communication Pursuant to article 94(3) EPC receivd for EP Application Seria 1 No. 18 712 345.0-1205 dated Oct. 25, 2020, 3 Pages.
Maenpaa, Mikko, "Blind Detection of Interfering Cell Data Channel Power Level in 3GPP LTE/LTE—Advanced Downlink," May 2016, 92 pages. Retrieved on Jul. 11, 2016. http://dspace.cc.tut.fi/dpub/bitstream/handle/123456789/24039/maenpaa.pdf?sequence=1.
Roessler et al., "LTE Advanced (3GPP Rel. 12) Technology Introduction White Paper," 2015, 60 pages. Retrieved on Jul. 11, 2016. http://www.rohde-schwarz.it/file/1MA252_2e_LTE_Rel12_technology.pdf.
Yang et al., "The Research on a New Method of Indicating Downlink Power Allocation through MAC Control Element in LTE System," Applied Mechanics and Materials, Trans Tech Publications, vols. 380-384, 2013, pp. 3608-3612.
Yamindi et al., "The Approach of the New Downlink Control Information Design for Transmission Mode 10," Wireless Telecommunications Symposium (WTS), IEEE, 2013, 7 pages.
"Frame Structure—Downlink," 22 pages. Retrieved on Jun. 21, 2017. http://www.sharetechnote.com/html/FrameStructure_DL.html.
International Search Report and Written Opinion received for International Application No. PCT/US2018/020753 dated Jun. 7, 2018, 15 pages.
Notice of Allowance received for U.S. Appl. No. 15/476,852 dated May 17, 2018, 24 pages.
Non-Final Office received for U.S. Appl. No. 15/343,098 dated Aug. 23, 2018, 35 pages.
Office Action dated Mar. 21, 2019 for U.S. Appl. No. 15/343,098, 17 pages.
Notice of Allowance dated Jul. 30, 2019 for U.S. Appl. No. 15/343,098, 18 pages.
Office Action dated Nov. 14, 2018 for U.S. Appl. No. 16/106,646, 12pages.
Non-Final Office Action received for U.S. Appl. No. 16/422,068 dated Oct. 4, 2019, 12 pages.
Office Action for Chinese Application No. 201880022651.7 dated Aug. 30, 2021, 16 pages.
Decision to Grant for Japanese Application Serial No. 2019-553865 dated Oct. 19, 2021, 3 Pages.
Examination report under sections 12 & 13 of the Patents Act, 1970 and the Patents Rules, 2003 for Indian Application Serial No. 201947038940 dated Oct. 4, 2021.
Communication Pursuant to article 94(3) EPC receivd for EP Application Seria INo. 18712345.0 dated Mar. 12, 2021, 4 Pages.

* cited by examiner

FACILITATING A MOBILE DEVICE SPECIFIC PHYSICAL DOWNLINK SHARED CHANNEL RESOURCE ELEMENT MAPPING INDICATOR

RELATED APPLICATION

The subject patent application is a continuation of, and claims priority to, U.S. patent application Ser. No. 15/343,098, (now U.S. Pat. No. 10,505,697), filed Nov. 3, 2016, and entitled "FACILITATING A MOBILE DEVICE SPECIFIC PHYSICAL DOWNLINK SHARED CHANNEL RESOURCE ELEMENT MAPPING INDICATOR," the entirety of which application is hereby incorporated by reference herein.

TECHNICAL FIELD

The subject disclosure relates generally to communications systems, and, for example, to systems, methods and/or machine-readable storage media for facilitating resource element (RE) mapping for efficient use of the downlink control channel in a wireless communication system.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G standards.

DETAILED DESCRIPTION

Figure 1:
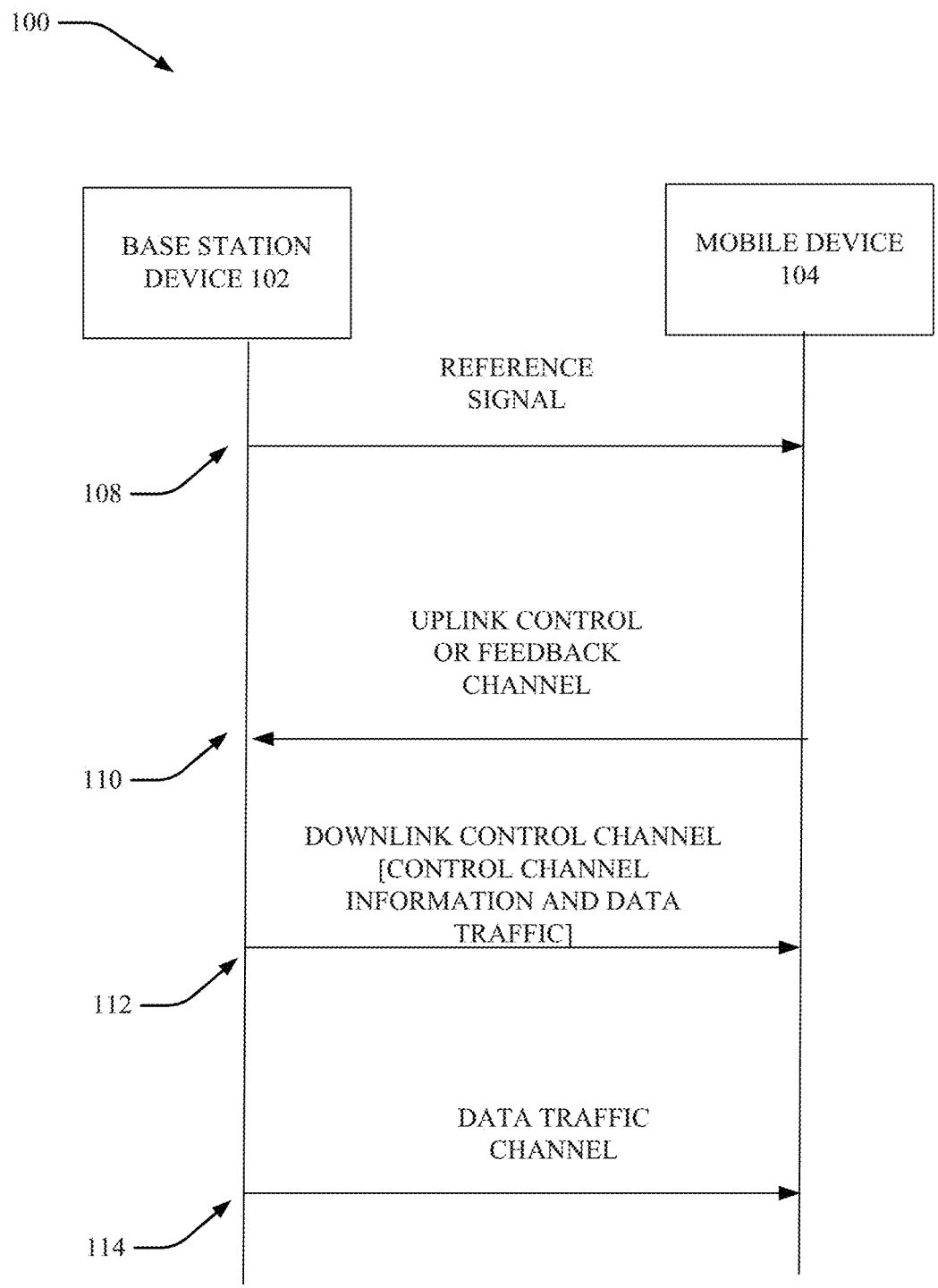
FIG. 1 illustrates an example, non-limiting message sequence flow chart to facilitate RE mapping for efficient use of the downlink control channel in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signalling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signalling-stream from one or more subscriber stations. Data and signalling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

In some wireless communication system control frameworks, the number of resources allocated for the data channel is indicated in the control channel. The mobile device can search the region where the control channel is located (e.g., orthogonal frequency division multiplexed (OFDM) symbols) and the resource elements. In some cases, if the control channel has reserved resources, these reserved resources cannot be used for transmission of the data channel notwithstanding the reserved resources may not be in use or may not be currently needed. Waste results. In some systems, data and control information cannot be multiplexed and this also results in waste and a decrease in link/system throughput. In one or more embodiments described herein, systems can dynamically indicate information to the mobile device about the PDSCH RE mapping pattern, which can cover the REs in the control region of the PDSCH. By doing such, the mobile device can be dynamically indicated to use any REs located in control region for receipt of data.

Systems, methods and/or machine-readable storage media for facilitating RE mapping for efficient use of the downlink control channel in a 5G wireless communication system are provided herein. Legacy wireless systems such as LTE, Long-Term Evolution Advanced (LTE-A), High Speed Packet Access (HSPA) etc. can have downlink control channels that carry information about the scheduling grants. Typically this includes a number of multiple input multiple output (MIMO) layers scheduled, transport block sizes, modulation for each codeword, parameters related to hybrid automatic repeat request (HARQ), subband locations and also precoding matrix index corresponding to the sub bands.

Typically, the following information can be transmitted based on the downlink control information (DCI) format: Localized/Distributed virtual resource block (VRB) assignment flag, resource block assignment, modulation and coding scheme, HARQ process number, new data indicator, redundancy version, transmit power control (TPC) command for uplink control channel, downlink assignment index, precoding matrix index and/or number of layers.

Currently, 3GPP is discussing the control channel design for NR systems. There are two approaches which are interesting. In the first approach, the downlink control channel is transmitted in two parts. In the first part, the network sends a part of the DCI that is common to certain group of mobile devices, and in the second part other parameters of the DCI can be transmitted for individual mobile devices. In the second approach, all the DCI parameters are transmitted to all mobile devices at once (in a single transmission). The methods outlined in this document are applicable to both the approaches.

As used herein, "5G" can also be referred to as New Radio (NR) access. Accordingly, systems, methods and/or machine-readable storage media for facilitating RE mapping for efficient use of the downlink control channel in a 5G wireless communication system are desired. As used herein, one or more aspects of a 5G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signalling efficiency enhanced compared to 4G; and/or latency significantly reduced compared to LTE.

One or more embodiments described herein can include systems, apparatus, methods and/or machine-readable storage media that can facilitate RE mapping for efficient use of the downlink control channel in a 5G wireless communication system are provided herein. In various embodiments, systems, apparatus, methods and/or machine-readable storage media can facilitate a RE mapping signalling framework that allows the mobile device to receive the physical downlink shared channel (PDSCH) RE mapping around any one or more arbitrary locations of the REs, including but not limited to, the REs in the control channel region.

In one embodiment, an apparatus is provided. The apparatus can comprise: a processor; and a memory that stores executable instructions that, when executed by the processor, facilitate performance of operations. The operations can comprise: selecting index information corresponding to a resource element mapping pattern of a group of resource element mapping patterns, wherein the group of resource element mapping patterns is associated with a mobile device of a group of mobile devices, wherein the resource element mapping pattern is a two-dimensional mapping pattern comprising associated control channel symbol locations on a first axis and associated subcarrier locations on a second axis, and wherein the index information is an index of a group of indices associated with respective ones of the group of resource element mapping patterns. The operations can also comprise transmitting the index information to the mobile device to inform the mobile device of a control channel symbol location at which data can be transmitted.

In another embodiment, a method is provided. The method can comprise determining, by a mobile device coupled to a processor, index information identifying a resource element mapping pattern of resource element mapping patterns indicative of a downlink control channel symbol subcarrier location at which data is able to be transmitted over a downlink channel to the mobile device, wherein the resource element mapping pattern is a multi-dimensional mapping pattern comprising associated control channel symbol locations on a first axis and associated subcarrier locations on a second axis. The method can also comprise determining, by the mobile device, whether to receive the data at the downlink control channel symbol subcarrier location based on an evaluation of a reception criterion.

In another embodiment, a machine-readable storage medium is provided. The machine-readable storage medium can comprise executable instructions that, when executed by a processor, facilitate performance of operations, comprising: determining index information identifying a resource element mapping pattern of resource element mapping patterns indicative of a downlink control channel symbol subcarrier location at which data is able to be transmitted over a downlink channel to the mobile device, wherein the resource element mapping pattern is a multi-dimensional mapping pattern comprising associated control channel symbol locations on a first axis and associated subcarrier locations on a second axis; and determining whether to receive the data at the downlink control channel symbol subcarrier location based on an evaluation of a reception criterion.

One or more embodiments can allow the BS device to flexibly signal to the mobile device 104 to use the REs located in the control region (e.g. the first OFDM symbol) for data in a dynamic manner (e.g., the mobile device can be configured with two patterns, one reuses the REs in the control region, one does not, for example). So the BS device can dynamically decide whether to reuse the REs in the control region. Going forward, in other embodiments, if we need to design a new reference signal that will occupy some REs in the PRB, we can simple block those REs by configuring a new RE mapping pattern to a legacy mobile device. So, although the legacy mobile device is not aware of the new reference signal, the legacy mobile device can avoid the REs used by those reference signals for the downlink data transmission to the mobile device.

FIG. 1 illustrates an example, non-limiting message sequence flow chart to facilitate RE mapping for efficient use of the downlink control channel in accordance with one or more embodiments described herein.

One or more embodiments can enable the BS device 102 to dynamically signal the mobile device 104 to use the REs located in the control region (e.g. the first OFDM symbol in some embodiments) for data in dynamic way. As used herein, dynamically signalling can mean signalling of information that can change from time to time. At one time the information signaled by the BS device 102 to the mobile device 104 can indicate a first RE pattern and at a second time the information signaled from the BS device 102 to the mobile device 104 can indicate a second RE pattern.

One or more of reference signals and/or pilot signals can be transmitted as shown at 108 of FIG. 1. The reference signals and/or the pilot signals can be beamformed or non-beamformed. The mobile device 104 can compute the channel estimates then determine the one or more parameters associated with channel state information (CSI) reporting. The CSI report can comprise example channel quality indicator (CQI), precoding matrix index (PMI), rank information (RI), the best subband indices, best beam indices etc. or any number of other types of information.

The CSI report can be sent from the mobile device 104 to the BS device via a feedback channel (e.g., feedback channel 110). The BS device 102 scheduler can use this information in choosing the parameters for scheduling of the particular mobile device 104. As used herein, the term "BS device 102" can be interchangeable with (or include) a network, a network controller or any number of other network components. The mobile device 104 can send the scheduling parameters to the mobile device 104 in the downlink control channel (e.g., downlink control channel 112). After this information is transmitted, the actual data transfer can be provided from the BS device 102 to the mobile device 104 over the data traffic channel 114.

The downlink control channel can carry information about the scheduling grants. As previously discussed, typically this includes a number of multiple input multiple output (MIMO) layers scheduled, transport block sizes, modulation for each codeword, parameters related to hybrid automatic repeat request (HARQ), subband locations and also precoding matrix index corresponding to the sub bands. Additionally, typically, the following information can be transmitted based on the downlink control information (DCI) format: Localized/Distributed virtual resource block (VRB) assignment flag, resource block assignment, modulation and coding scheme, HARQ process number, new data indicator, redundancy version, transmit power control (TPC) command for uplink control channel, downlink assignment index, precoding matrix index and/or number of layers.

In some embodiments, downlink control channel can also carry data in one or more subcarriers of an OFDM control channel symbol to improve efficiency of the control channel. As shown in FIG. 1, the downlink control channel can include data or control channel information.

In various embodiments, the systems described herein can provide approaches for the control channel transmission. In the first approach, the control channel is transmitted in two parts. In the first part, the network sends some portion of the DCI that is common to certain group of mobile devices, and in the second part other parameters of the DCI are transmitted for individual mobile devices. In the second approach, all the DCI parameters are transmitted to all (or, in some embodiments, to one or mobile devices) at once (or in a single transmission, simultaneously and/or concurrently). The embodiments detailed herein are applicable to both the approaches.

Figure 2:
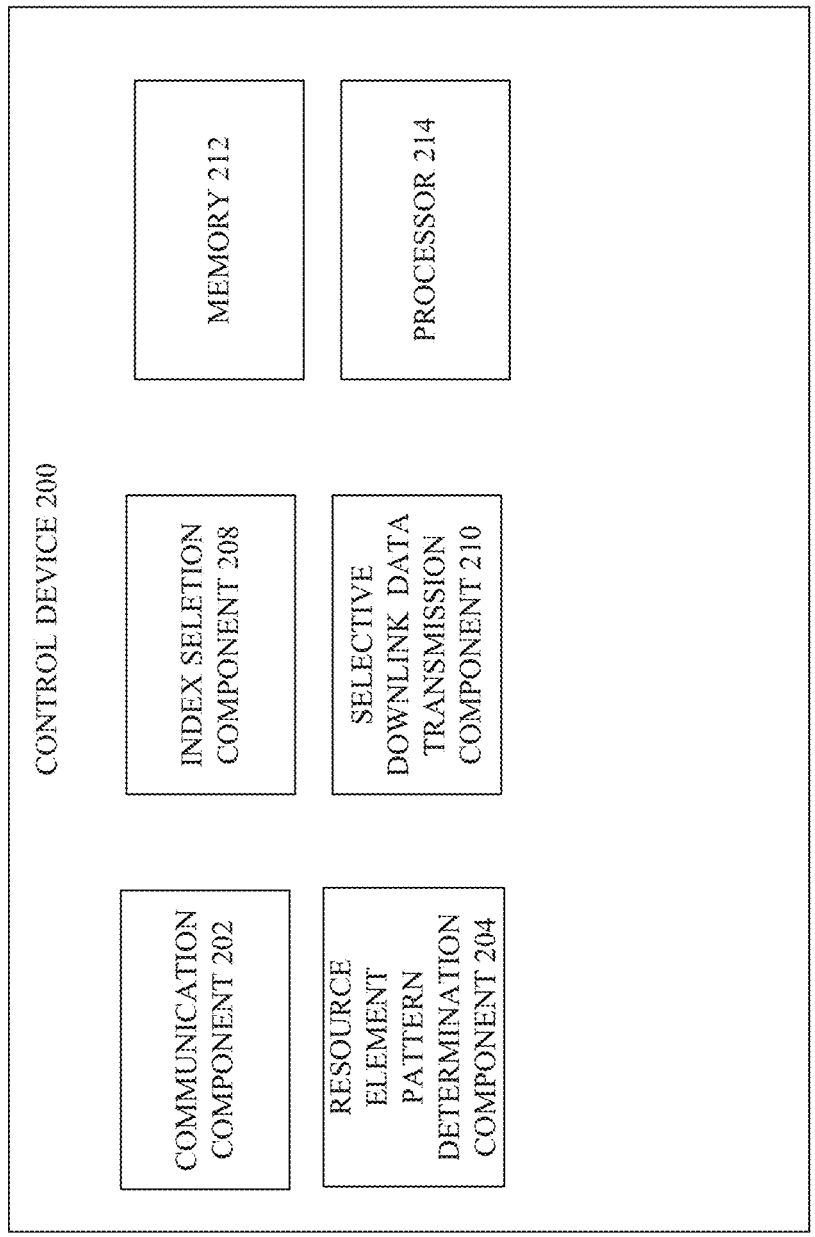
FIG. 2 illustrates an example, non-limiting block diagram of a control device that can facilitate RE mapping, index selection and/or selective downlink data transmission for efficient use of the downlink control channel in accordance with one or more embodiments described herein.
Figure 3:
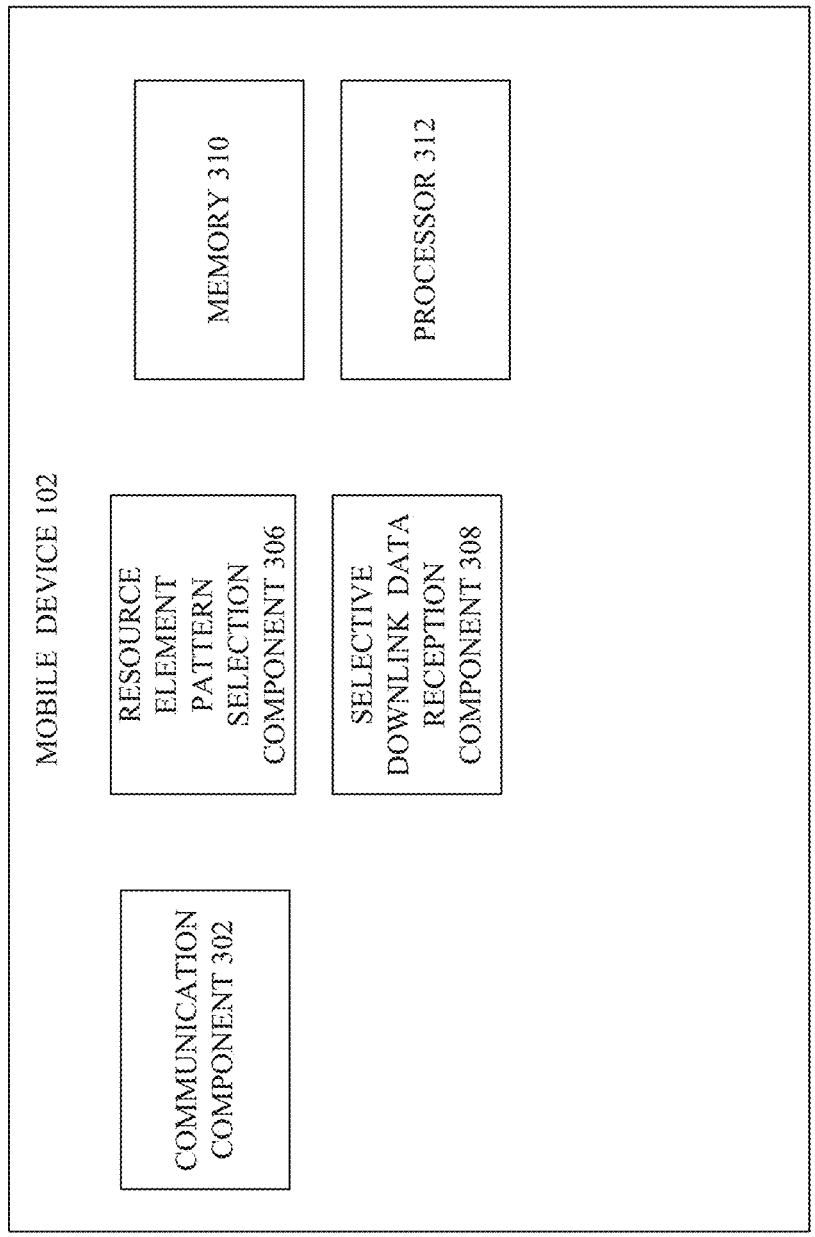
FIG. 3 illustrates an example, non-limiting block diagram of a downlink selection device that employs RE mapping to determine downlink control channels for receipt of data transmissions in accordance with one or more embodiments described herein.

One or more aspects of the system will be described with reference to FIGS. 2, 3, 4, 5, 7 and/or 7. FIG. 2 illustrates an example, non-limiting block diagram of a control device that can facilitate RE mapping, index selection and/or selective downlink data transmission for efficient use of the downlink control channel in accordance with one or more embodiments described herein. FIG. 3 illustrates an example, non-limiting block diagram of a downlink selection device that employs RE mapping to determine downlink control channels for receipt of data transmissions in accordance with one or more embodiments described herein. FIGS. 4, 5, 6 and 7 illustrate example, non-limiting RE mapping patterns that can be employed to facilitate RE mapping for efficient use of the downlink control channel in accordance with one or more embodiments described herein. Repetitive description of like elements employed in other embodiments described herein is omitted for sake of brevity.

Turning first to FIG. 2, the control device 200 can be comprised in the BS device 102 and/or any other network control device that can generate information for control of the information to be transmitted on the downlink control channel. In one or more embodiments, the BS device 102 and/or the control device 200 can indicate the RE pattern for one or more mobile devices dynamically (e.g., via physical layer signalling, example DCI signalling) or semi-statically (e.g., higher layer or radio resource control (RRC) signalling).

The control device 200 can comprise communication component 202, RE pattern determination component 204, index selection component 208, selective downlink data transmission component 210, memory 212 and/or processor 214. In some embodiments, one or more of communication component 202, RE pattern determination component 204, index selection component 208, selective downlink data transmission component 210, memory 212 and/or processor 214 can be electrically and/or communicatively coupled to one another to perform one or more functions of control device 200.

The communication component 202 can transmit and/or receive control and/or data information to and/or from one or more mobile devices (e.g., mobile device 104). In some embodiments, the communication component 202 can transmit the downlink control channel. For example, in one embodiment, the communication component 202 can transmit the downlink control channel in two parts. In the first part, the communication component 202 transmits a portion of the DCI that is common to certain group of mobile devices (for example, mobile device 104 and one or more other mobile devices), and in the second part other parameters of the DCI can be transmitted for individual mobile devices (e.g., for example, for mobile device 104).

In another embodiment, the communication component 202 can transmit multiple (or, in some embodiments, all) of the DCI parameters to all mobile devices (e.g., a group of mobile devices including mobile device 104).at once (in a single transmission, in overlapping time slots or transmission time intervals (TTIs) or the like).

In some embodiments, the communication component 202 can transmit one or more different RE patterns indicating whether one or more control channel subcarriers is a candidate for transmission of data over the subcarrier (in lieu of transmission of control channel information over the subcarrier). For example, with reference to FIG. 2, the RE pattern determination component 204 can determine multiple different RE patterns.

The RE patterns can be two-dimensional bit maps in some embodiments. In some embodiments, there can be a two-dimensional bitmap for each physical resource block (PRB): The OFDM symbols * subcarriers for one PRB (e.g., if the number of OFDM symbols is 7 in a slot, and the number of subcarrier is 12, then the bitmap is 7 by 12). The two-dimensional bitmaps can be populated with bit values 0 and 1 to indicate whether a RE corresponding to a particular (OFDM symbol location, subcarrier location) combination can be employed for transmission of control channel information or data.

In some embodiments, if bit value at the RE is a first value (e.g., "0"), data cannot be transmitted at that OFDM symbol location, subcarrier location; if the bit value at the RE is a second value (e.g., "1"), data can be transmitted at that OFDM symbol location, subcarrier location. Accordingly, in some embodiments, each bit in the bitmap indicates whether the subcarrier on that OFDM symbol can be used for PDSCH RE mapping or not. The bitmap can also include the symbols designed for control channels (e.g., if the first symbol is designed for control channel transmission, but the bitmap can still indicate UE to use those REs).

Accordingly, the different RE patterns can indicate control channel symbol subcarriers over which data can be transmitted and control channel symbol subcarriers over which control channel information can be transmitted. Use of traditional control channels (e.g., symbol location 0 of FIGS. 4, 5, 6 and 7) and use of traditional data channels (e.g., symbol locations 1-13 of FIGS. 4, 5, 6 and 7) can be specified in any number of configurations (and one or more different mobile devices can receive different sets of RE patterns—as such, the RE patterns can be specific to one or more different mobile devices or individualized to be unique for each mobile device).

In various embodiments, the index selection component 208 of the control device 200 can transmit information indicative of a RE pattern that indicates the downlink reception for the mobile device 104. In some embodiments, the index is transmitted in the DCI to indicate to the mobile device about which RE mapping pattern to use in current PDSCH transmission. Thus the control device 200 or BS device 102 can change the RE mapping pattern for every TTI. The index can change from time to time based on the index selection component 208 selecting different indices. Each RE pattern can correspond to a different index. Thus, the RE pattern 400 of FIG. 4 can be represented by index "1," for example, and the RE pattern 600 of FIG. 6 can be represented by index "2." Any number of RE patterns (and therefore any number of corresponding indices) can be available for selection by the index selection component 208. The selective downlink data transmission component 210 can transmit the data selectively on one or more different channels based on the RE pattern. The data can be transmitted according to the initial RE pattern determined (e.g., RE pattern 400) or based on two-stage analysis performed by the mobile device 104 and the results of which are transmitted to the control device 200.

The memory 212 can be a computer-readable storage medium storing computer-executable instructions and/or information configured to perform one or more of the functions described herein with reference to the control device. For example, in some embodiments, the memory 212 can store computer-readable storage media associated with determining one or more RE patterns, determining an index for selection of a pattern and the like. The processor 214 can perform one or more of the functions described herein with reference to the control device 200.

Turning also to FIG. 3, the mobile device 102 can comprise communication component 302, RE pattern selection component 206, selective downlink data reception component 308, memory 310 and/or processor 312. In some embodiments, one or more of communication component 302, RE pattern selection component 206, selective downlink data reception component 308, memory 310 and/or processor 312 can be electrically and/or communicatively coupled to one another to perform one or more functions of mobile device 102.

After the patterns are determined and sent to the mobile device 102 the RE patterns can be stored at the mobile device 104 and/or accessible to the mobile device 104 over a network. The communication component 302 can receive the one or more RE patterns and/or can access one or more RE patterns over a network. One or more of the RE patterns can be updated from time to time for use by the mobile device 104.

FIGS. 4, 5, 6 and 7 illustrate example, non-limiting RE mapping patterns that can be employed to facilitate RE mapping for efficient use of the downlink control channel in accordance with one or more embodiments described herein. The mobile device 104 can be configured with and/or store two or more different RE patterns. The different RE patterns can indicate which OFDM symbol subcarriers that are associated with control channels on the downlink can be employed for transmission of data. In various embodiments, different RE patterns can be configured by the BS device 102 and/or the control device 200. The RE patterns can be configured differently from time to time and the set of RE patterns configured for the mobile device 104 can therefore be dynamically changed based on any number of factors. For example, in some embodiments, if the control device 200 or BS device 102 determines that one or more control channel subcarriers are being routinely unused (or have a use rate less than a defined threshold, for example), the control device 200 or BS device 102 can indicate the control channel OFDM symbol subcarriers that are unused as those that can be employed for data transmission for one or more subsequent downlink control channel transmissions.

Figure 4:
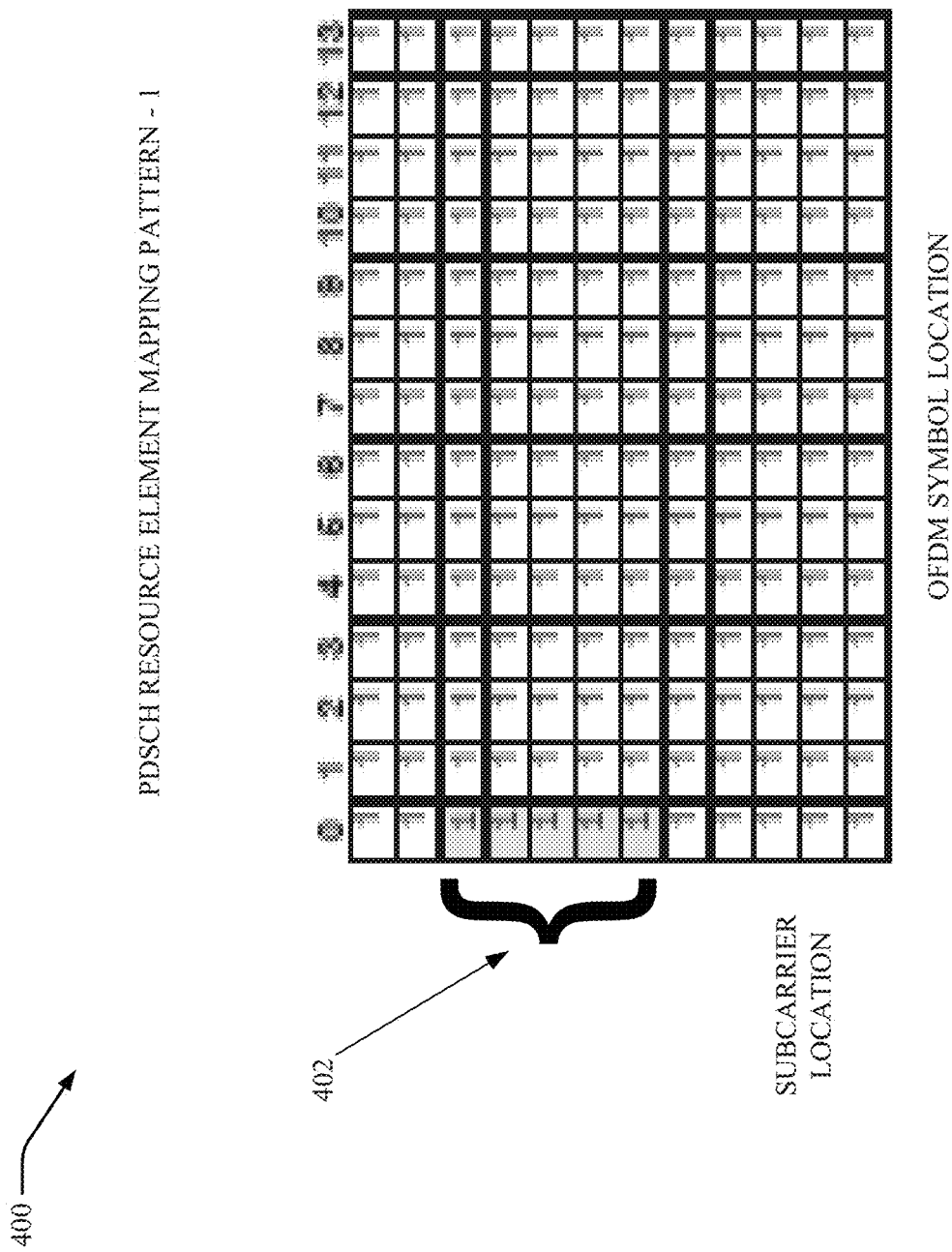
FIGS. 4, 5, 6 and 7 illustrate example, non-limiting RE mapping patterns that can be employed to facilitate RE mapping for efficient use of the downlink control channel in accordance with one or more embodiments described herein.

As described, the different RE patterns can indicate control channel symbol subcarriers over which data can be transmitted and control channel symbol subcarriers over which control channel information can be transmitted. For example, as shown in FIG. 4, the first pattern 400 shows that the RE pattern determination component initially transmits an RE pattern 400 to the mobile device 104 showing that any RE (combination of OFDM symbol and subcarrier) can be employed to transmit data. Thus, the resource element pattern selection component 306 of the mobile device 104 can determine that the control channel (e.g., symbol location 0) is indicated by the RE pattern determination component 204 as being able to be fully utilized to transmit data on any of the OFDM symbol location 0 subcarriers. Such is shown by populating each RE with the value "1," for example, in FIG. 4. In some embodiments, REs 402 can be employed for downlink control channel information and the other subcarriers associated with the control channel (e.g., associated with OFDM symbol location 0 that are not included in the subset of REs represented by 402) can be employed for data transmission on the downlink to the mobile device 104.

However, in some of the embodiments described herein, the resource element pattern selection component 306 of the mobile device 104 can have a two-stage evaluation process that can be performed by the mobile device 104 upon receipt of the RE pattern 400 to determine which REs can actually be used for reception of data. The two-stage analysis can be as follows. The RE pattern 400 can be received by the mobile device 104. The resource element pattern selection component 306 of the mobile device 104 can determine the REs on which data can be received based on the RE pattern 400 and one or more different criteria. The resource element pattern selection component 306 of the mobile device 104 can determine: 1) whether data should/will actually be received on any REs based on which REs are indicated in the initial RE pattern (e.g., patterns 400, 600) are indicated as being available for data reception; 2) whether there are any reference signals received on the RE (in actuality) or that the mobile device 104 expects to be received on the RE OR if there are any control channels that the mobile device 104 does or will use for its own control information (e.g., mobile device control information).

Figure 5:
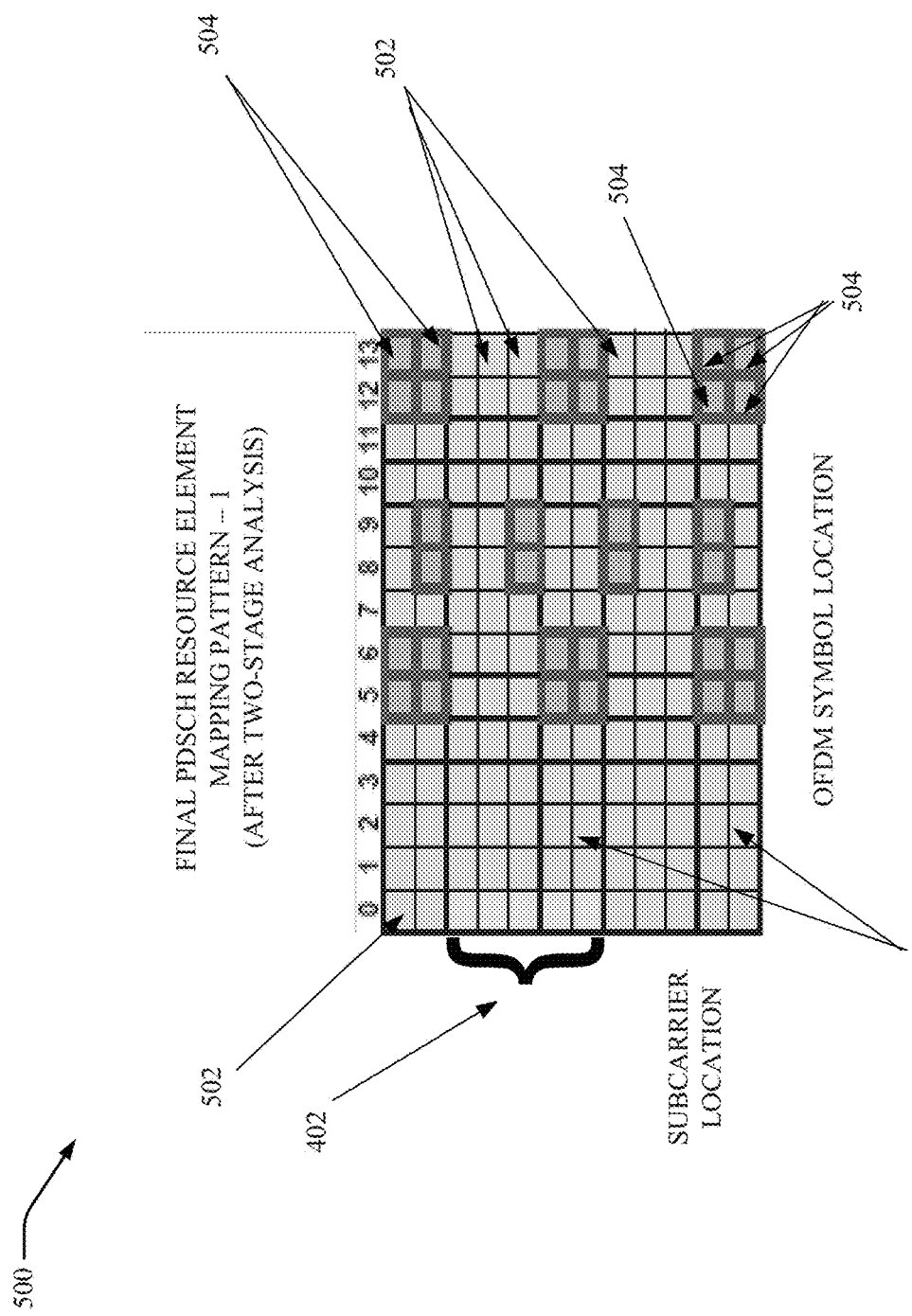
Figure 6:
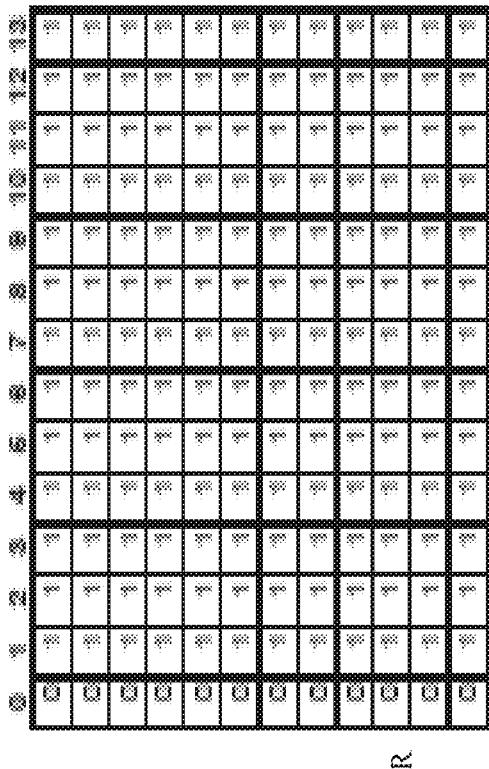
Figure 7:
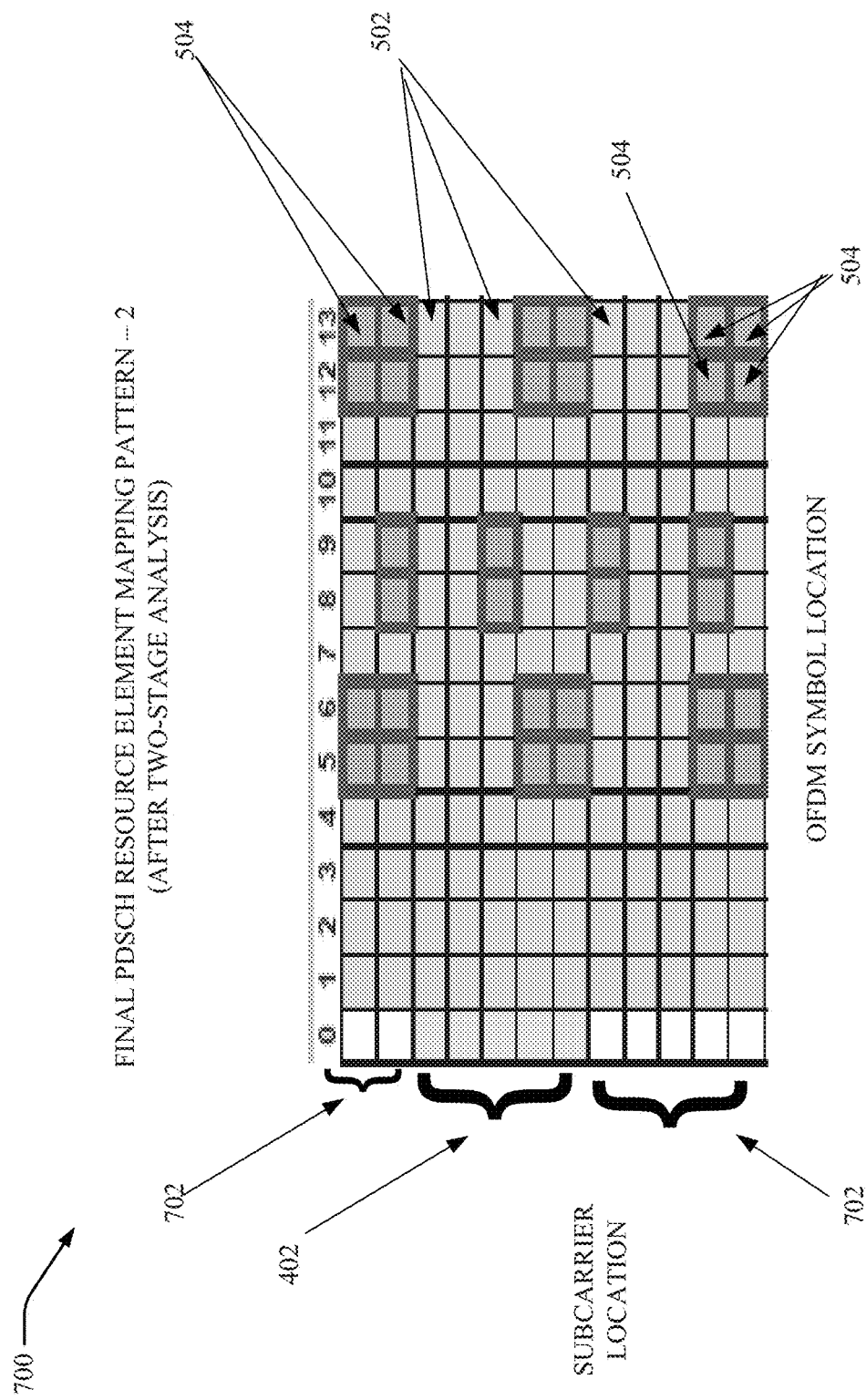

In step two of the analysis, if a RE is indicated as being associated with receipt of a reference signal (current or future receipt), such RE will not be employed for receipt of data notwithstanding such can be indicated as a candidate RE for receipt of data at such RE by the mobile device 104. Based on the analysis, the resource element pattern selection component 306 of the mobile device 104 can update the RE pattern 400 to generate a new, modified RE pattern 500 that is a modified version of RE pattern 400 resultant from the two-stage analysis (or to generate information indicating on which REs data indicated as being able to be received in RE pattern 400 will not actually be received). As shown in FIG. 5, RE pattern 400 can be modified to RE pattern 500 to indicate the dark gray REs (some of which are shown labeled with reference numeral 504) are those associated with reference signals and therefore notwithstanding RE pattern 400 indicates value "1" for those REs, no data can be received on those REs. As also shown in FIG. 5, yellow REs (some of which are shown labeled with reference numeral 502) are those on which data can be received. The REs shown as green REs (which are shown as reference numeral 402) can be employed for receipt of control channel information in some embodiments (or data can be received at one or more of these locations in other embodiments).

In step two of the analysis, although not shown, mobile device 104 can also determine if there are any control channels that the mobile device 104 does or will use for its own control information (e.g., mobile device control information). If the mobile device 104 determines that any such REs are or will be used for the mobile device control information, mobile device 104 can generate a new, modified RE pattern that is a modified version of RE pattern 400 resultant from the two-stage analysis (or to generate information indicating on which REs data indicated as being able to be received in RE pattern 400 will not actually be received).

Original RE pattern 600 can be determined and sent to the mobile device 104 by the control device 200 or BS device 102. As shown, in the case of RE pattern 600, none of the REs for the subcarriers on the OFDM symbol are allocated for data. As such, these subcarriers cannot be employed for data transmission. The RE pattern 700 can be determined based on the two-stage analysis described above with regard to various criterion associated with reference signals, mobile device control channel information or any number of other criteria. At 702, REs are shown that are not used for data transmission but that are also not used for control channel information. Thus, in some embodiments, opportunity to transmit data at those REs associated with 702 may be lost.

Accordingly, one or more of these embodiments can be employed for transmission of data on ODFM control channel symbol locations typically reserved for control channel information. In some embodiments, as shown, symbol locations typically employed for data transmission (e.g., one or more of OFDM symbol locations 1-13) can be employed for mobile device control channel information and/or reference signals.

As described, in some embodiments, even if the RE pattern indicates an RE can be used for data or for PDSCH, the mobile device 104 may not use the RE for data in several conditions. For example, in one case, the same RE can be used by a reference signal configured to that particular mobile device 104 (e.g., the CSI-RS or DMRS configured by the mobile device 104). In another case, the same RE can be used by the control channel for mobile device 104 (e.g., when the mobile device 104 successfully decodes the control channel, the mobile device can exclude the REs used for the control channel from PDSCH even if the RE Pattern (e.g., DCI) indicates those REs can be used for PDSCH. In some embodiments, the mobile device 104 can do PDSCH RE mapping (and therefore receive information) on all allocated PRBs (indicated in the DCI signalling) following the RE mapping pattern.

Accordingly, one or more embodiments can provide for mobile device specific dynamic PDSCH RE mapping to allow for flexible multiplexing of data and control. Accordingly, in one or more embodiments, a semi-static and/or dynamic signalling framework for the PDSCH RE mapping can be provided. Multiple RE mapping patterns can be configured semi-statically to the mobile device 104 prior to operation and/or can be updated from time to time. Then the BS device 102 can dynamically indicate one pattern to use in a current (and, in some embodiments, a future) PDSCH transmission. The RE mapping pattern can be in the format of two-dimensional bitmap, which can indicate REs in any OFDM symbols or subcarriers. Such flexible signalling framework allows dynamic sharing of the REs between control and data channel. Also, since the legacy UE can be configured to map the PDSCH around any arbitrary REs, future releases/versions of wireless communication systems (and mobile devices that utilize such) can introduce new features occupying some REs without considering the negative implications of such.

Figure 8:
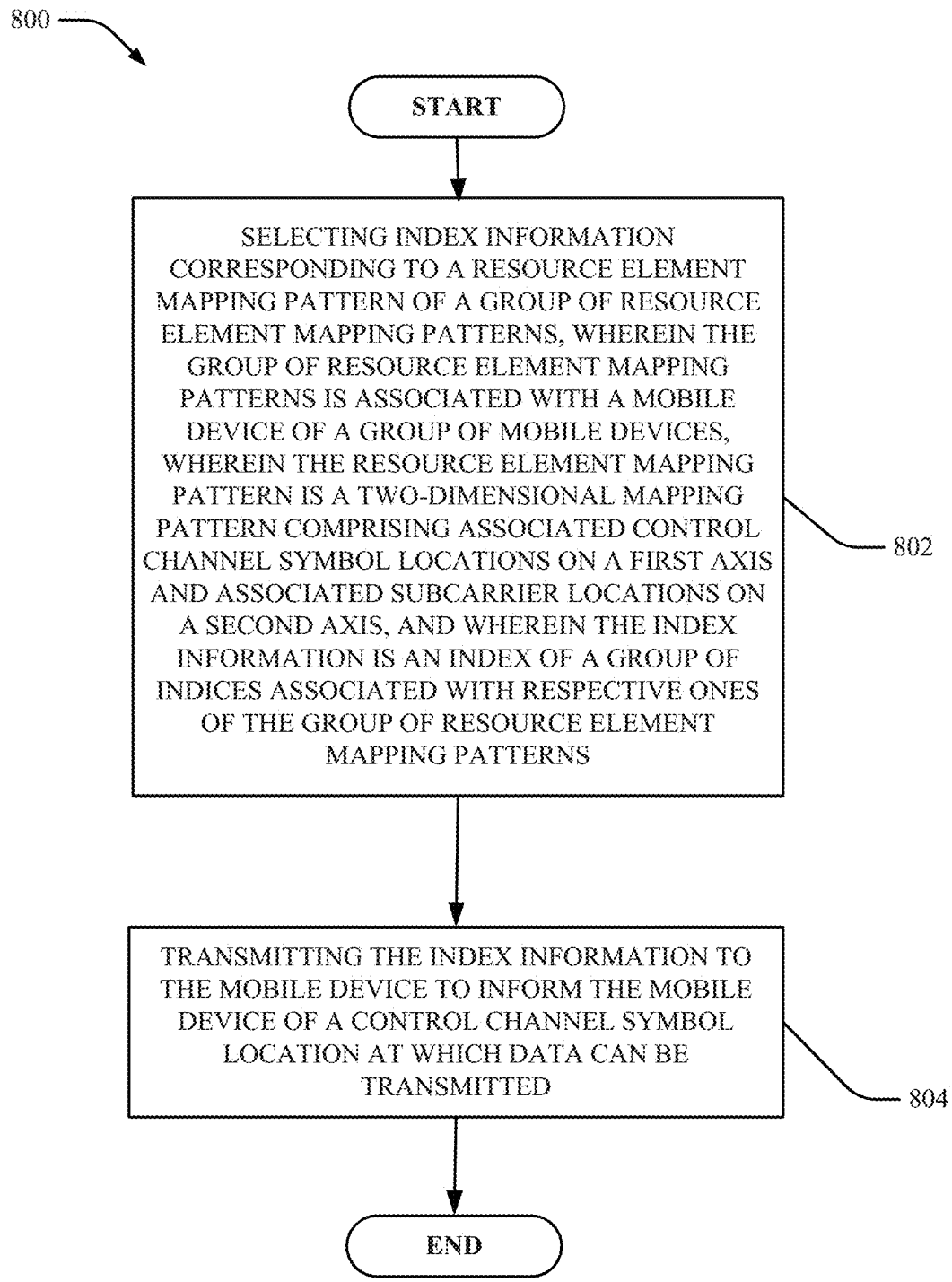
FIGS. 8, 9 and 10 illustrate flowcharts of methods that facilitate RE mapping for efficient use of the downlink control channel in accordance with one or more embodiments described herein.
Figure 9:
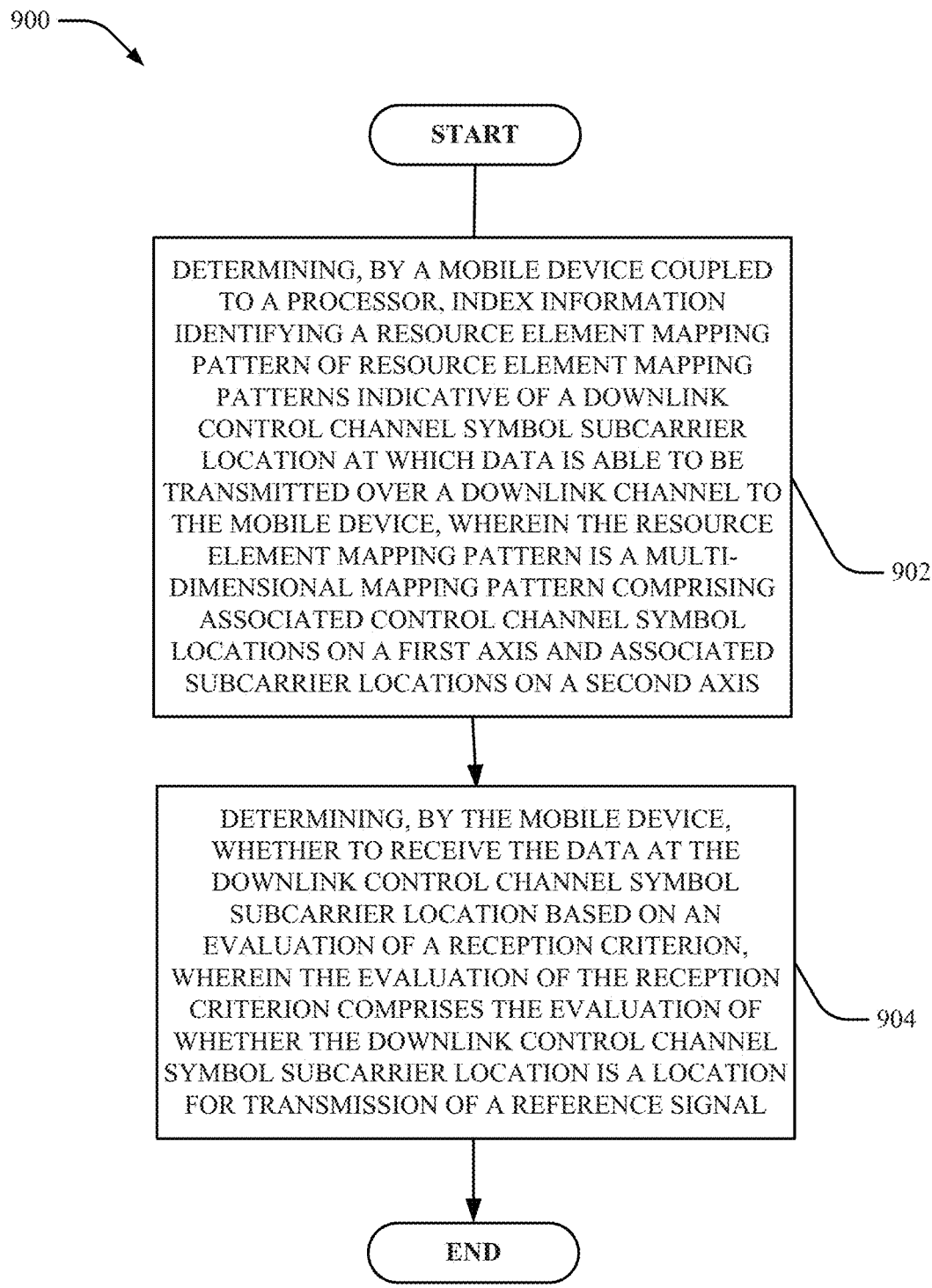
Figure 10:
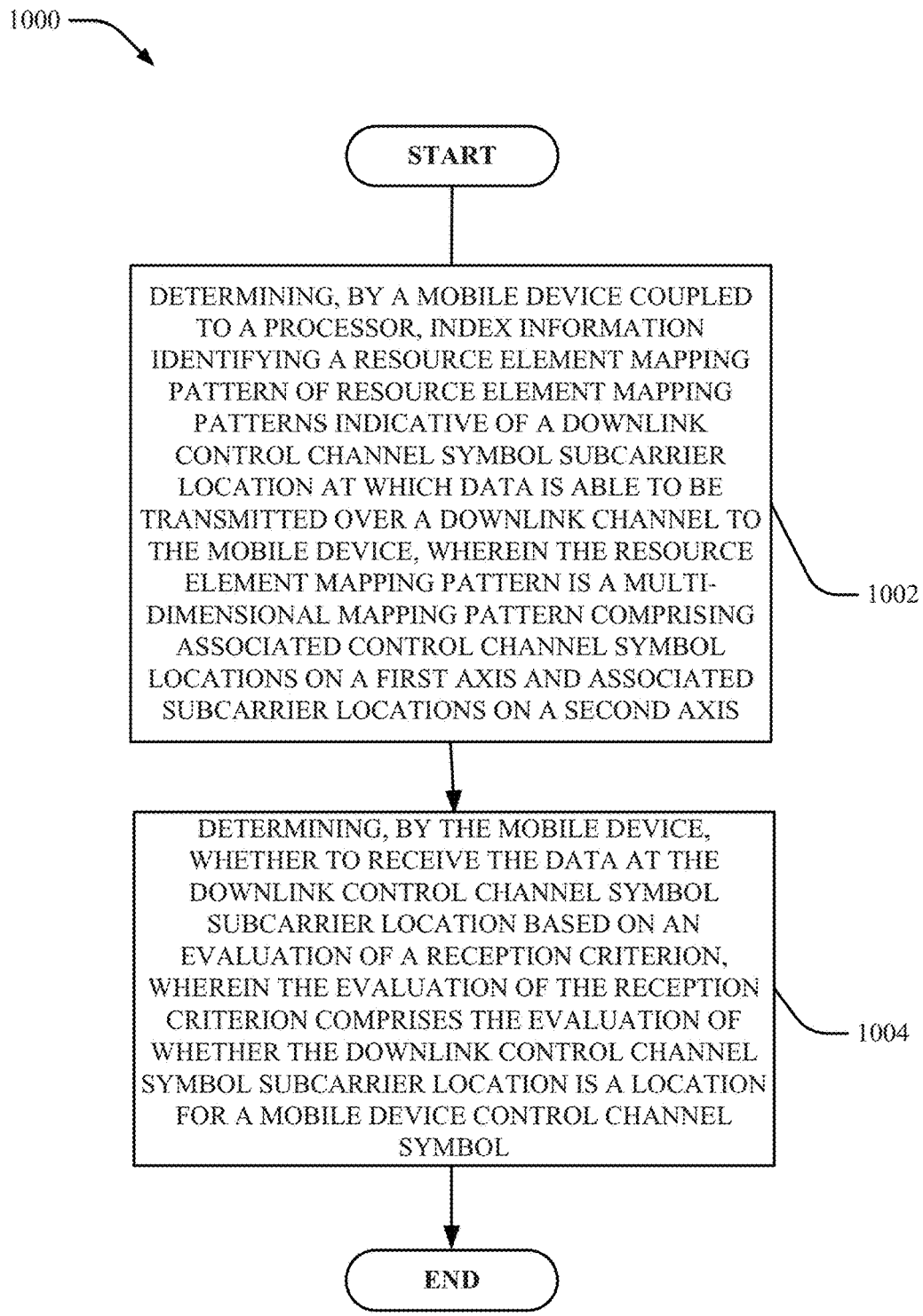

FIGS. 8, 9 and 10 illustrate flowcharts of methods that facilitate RE mapping for efficient use of the downlink control channel in accordance with one or more embodiments described herein. Repetitive description of like elements employed in other embodiments described herein is omitted for sake of brevity.

Turning first to FIG. 8, at 802, method 800 can comprise selecting index information corresponding to a resource element mapping pattern of a group of resource element mapping patterns, wherein the group of resource element mapping patterns is associated with a mobile device of a group of mobile devices, wherein the resource element mapping pattern is a two-dimensional mapping pattern comprising associated control channel symbol locations on a first axis and associated subcarrier locations on a second axis, and wherein the index information is an index of a group of indices associated with respective ones of the group of resource element mapping patterns (e.g., by the BS device 102 and/or the control device 200 of the BS device 102).

In some embodiments, the two-dimensional mapping pattern comprises a first bit value indicative of the data being able to be transmitted at a first control channel symbol location and a second bit value indicative of the data failing to be able to be transmitted at the first control channel symbol location. In some embodiments, selecting the index information comprises a first value at a first time and the index information comprises a second value at a second time.

In some embodiments, the RE mapping pattern further comprises symbol information indicative of a control channel symbol.

At 804, method 800 can comprise transmitting the index information to the mobile device to inform the mobile device of a control channel symbol location at which data can be transmitted (e.g., by the BS device 102 and/or the control device 200 of the BS device 102).

Turning now to FIG. 9, at 902 method 900 can comprise determining, by a mobile device coupled to a processor, index information identifying a resource element mapping pattern of resource element mapping patterns indicative of a downlink control channel symbol subcarrier location at which data is able to be transmitted over a downlink channel to the mobile device, wherein the resource element mapping pattern is a multi-dimensional mapping pattern comprising associated control channel symbol locations on a first axis and associated subcarrier locations on a second axis.

At 904, method 900 can comprise determining, by the mobile device, whether to receive the data at the downlink control channel symbol subcarrier location based on an evaluation of a reception criterion. In some embodiments, the evaluation of the reception criterion comprises the evaluation of whether the downlink control channel symbol subcarrier location is a location for transmission of a reference signal. For example, determining whether to receive the data can comprise determining not to receive the data at the downlink control channel symbol subcarrier location indicated as available for the reception of the data based on a determination that the downlink control channel symbol subcarrier location is the location for the transmission of the reference signal.

In some embodiments, although now shown, method 900 can comprise receiving, by the mobile device, the data at the downlink control channel symbol subcarrier location indicated as available for the reception of the data. The method 900 can also comprise accessing, by the mobile device, the resource element mapping patterns, wherein the accessing is performed via a network device of a network to which the mobile device is communicatively coupled. The method 900 can also comprise storing, by the mobile device, the resource element mapping patterns.

Turning now to FIG. 10, at 1002, method 1000 can comprise determining, by a mobile device coupled to a processor, index information identifying a resource element mapping pattern of resource element mapping patterns indicative of a downlink control channel symbol subcarrier location at which data is able to be transmitted over a downlink channel to the mobile device, wherein the resource element mapping pattern is a multi-dimensional mapping pattern comprising associated control channel symbol locations on a first axis and associated subcarrier locations on a second axis.

At 1004, method 1000 can comprise determining, by the mobile device, whether to receive the data at the downlink control channel symbol subcarrier location based on an evaluation of a reception criterion. In some embodiments, the evaluation of the reception criterion comprises the evaluation of whether the downlink control channel symbol subcarrier location is a location for a mobile device control channel symbol. For example, the determining whether to receive the data comprises determining not to receive the data at the downlink control channel symbol subcarrier location indicated as available for the reception of the data based on a determination that the downlink control channel symbol subcarrier location is the location for the mobile device control channel symbol.

In some embodiments, although now shown, method 1000 can comprise receiving, by the mobile device, the data at the downlink control channel symbol subcarrier location indicated as available for the reception of the data. The method 1000 can also comprise accessing, by the mobile device, the resource element mapping patterns, wherein the accessing is performed via a network device of a network to which the mobile device is communicatively coupled. The method 1000 can also comprise storing, by the mobile device, the resource element mapping patterns.

Figure 11:
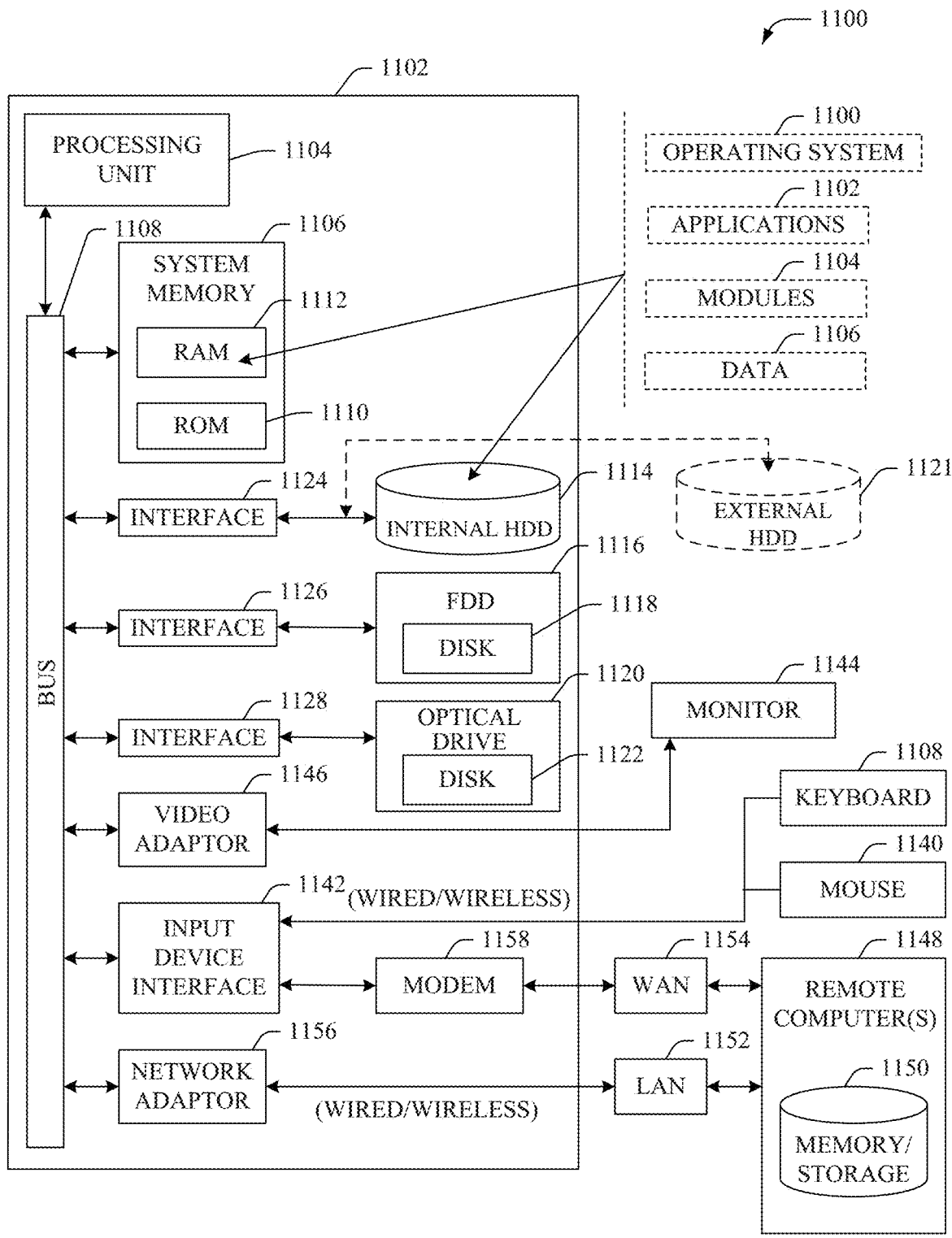
FIG. 11 illustrates a block diagram of a computer that can be employed in accordance with one or more embodiments described herein.

FIG. 11 illustrates a block diagram of a computer that can be employed in accordance with one or more embodiments. Repetitive description of like elements employed in other embodiments described herein is omitted for sake of brevity.

In some embodiments, the computer, or a component of the computer, can be or be comprised within any number of components described herein comprising, but not limited to, base station device 102 or mobile device 104 (or a component of base station device 102 or mobile device 104). In order to provide additional text for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules comprise routines, programs, components, data structures, etc., that perform particular tasks or implement particular abstract data types. Moreover, those skilled in the art will appreciate that the various methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable (or machine-readable) storage media and/or communications media, which two terms are used herein differently from one another as follows. Computer-readable (or machine-readable) storage media can be any available storage media that can be accessed by the computer (or a machine, device or apparatus) and comprises both volatile and nonvolatile media, removable and non-removable media. By way of example, and not limitation, computer-readable (or machine-readable) storage media can be implemented in connection with any method or technology for storage of information such as computer-readable (or machine-readable) instructions, program modules, structured data or unstructured data. Tangible and/or non-transitory computer-readable (or machine-readable) storage media can comprise, but are not limited to, random access memory (RAM), read only memory (ROM), electrically erasable programmable read only memory (EE-PROM), flash memory or other memory technology, compact disk read only memory (CD-ROM), digital versatile disk (DVD) or other optical disk storage, magnetic cassettes, magnetic tape, magnetic disk storage, other magnetic storage devices and/or other media that can be used to store desired information. Computer-readable (or machine-readable) storage media can be accessed by one or more local or remote computing devices, e.g., via access requests, queries or other data retrieval protocols, for a variety of operations with respect to the information stored by the medium.

In this regard, the term "tangible" herein as applied to storage, memory or computer-readable (or machine-readable) media, is to be understood to exclude only propagating intangible signals per se as a modifier and does not relinquish coverage of all standard storage, memory or computer-readable (or machine-readable) media that are not only propagating intangible signals per se.

In this regard, the term "non-transitory" herein as applied to storage, memory or computer-readable (or machine-readable) media, is to be understood to exclude only propagating transitory signals per se as a modifier and does not relinquish coverage of all standard storage, memory or computer-readable (or machine-readable) media that are not only propagating transitory signals per se.

Communications media typically embody computer-readable (or machine-readable) instructions, data structures, program modules or other structured or unstructured data in a data signal such as a modulated data signal, e.g., a channel wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 11, the example environment 1100 for implementing various embodiments of the embodiments described herein comprises a computer 1102, the computer 1102 comprising a processing unit 1104, a system memory 1106 and a system bus 1108. The system bus 1108 couples system components comprising, but not limited to, the system memory 1106 to the processing unit 1104. The processing unit 1104 can be any of various commercially available processors. Dual microprocessors and other multiprocessor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 comprises ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also comprise a high-speed RAM such as static RAM for caching data.

The computer 1102 further comprises an internal hard disk drive (HDD) 1110 (e.g., EIDE, SATA), which internal hard disk drive 1114 can also be configured for external use in a suitable chassis (not shown), a magnetic floppy disk drive 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface, respectively. The interface 1124 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable (or machine-readable) storage media provide nonvolatile storage of data, data structures, computer-executable instructions, and so forth. For the computer 1102, the drives and storage media accommodate the storage of any data in a suitable digital format. Although the description of computer-readable (or machine-readable) storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1112, comprising an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

A communication device can enter commands and information into the computer 1102 through one or more wired/wireless input devices, e.g., a keyboard 1138 and a pointing device, such as a mouse 1140. Other input devices (not shown) can comprise a microphone, an infrared (IR) remote control, a joystick, a game pad, a stylus pen, touch screen or the like. These and other input devices are often connected to the processing unit 1104 through an input device interface 1142 that can be coupled to the system bus 1108, but can be connected by other interfaces, such as a parallel port, an IEEE 1394 serial port, a game port, a universal serial bus (USB) port, an IR interface, etc.

A monitor 1144 or other type of display device can be also connected to the system bus 1108 via an interface, such as a video adapter 1146. In addition to the monitor 1144, a computer typically comprises other peripheral output devices (not shown), such as speakers, printers, etc.

The computer 1102 can operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically comprises many or all of the elements described relative to the computer 1102, although, for purposes of brevity, only a memory/storage device 1150 is illustrated. The logical connections depicted comprise wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1152 through a wired and/or wireless communication network interface or adapter 1156. The adapter 1156 can facilitate wired or wireless communication to the LAN 1152, which can also comprise a wireless AP disposed thereon for communicating with the wireless adapter 1156.

When used in a WAN networking environment, the computer 1102 can comprise a modem 1158 or can be connected to a communications server on the WAN 1154 or has other means for establishing communications over the WAN 1154, such as by way of the Internet. The modem 1158, which can be internal or external and a wired or wireless device, can be connected to the system bus 1108 via the input device interface 1142. In a networked environment, program modules depicted relative to the computer 1102 or portions thereof, can be stored in the remote memory/storage device 1150. It will be appreciated that the network connections shown are example and other means of establishing a communications link between the computers can be used.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a defined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a femto cell device. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10 Base T wired Ethernet networks used in many offices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of an acquired network. A classifier is a function that maps an input attribute vector, x=(x1, x2, x3, x4, . . . , xn), to a confidence that the input belongs to a class, that is, f(x)=confidence(class). Such classification can employ a probabilistic and/or statistical-based analysis (e.g., factoring into the analysis utilities and costs) to prognose or infer an action that a communication device desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing communication device behavior, operator preferences, historical information, receiving extrinsic information). For example, SVMs can be configured via a learning or training phase within a classifier constructor and feature selection module. Thus, the classifier (s) can be used to automatically learn and perform a number of functions, comprising but not limited to determining according to a predetermined criteria which of the acquired cell sites will benefit a maximum number of subscribers and/or which of the acquired cell sites will add minimum value to the existing communication network coverage, etc.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of communication device equipment. A processor can also be implemented as a combination of computing processing units.

As used herein, terms such as "data storage," "database," and substantially any other information storage component relevant to operation and functionality of a component, refer to "memory components," or entities embodied in a "memory" or components comprising the memory. It will be appreciated that the memory components or computer-readable (or machine-readable) storage media, described herein can be either volatile memory or nonvolatile memory or can comprise both volatile and nonvolatile memory.

Memory disclosed herein can comprise volatile memory or nonvolatile memory or can comprise both volatile and nonvolatile memory. By way of illustration, and not limitation, nonvolatile memory can comprise read only memory (ROM), programmable ROM (PROM), electrically programmable ROM (EPROM), electrically erasable PROM (EEPROM) or flash memory. Volatile memory can comprise random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to comprise, without being limited to, these and any other suitable types of memory.

What has been described above comprises mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "comprises" is used in either the detailed description or the claims, such term is intended to be inclusive in a manner similar to the term "comprising" as "comprising" is interpreted when employed as a transitional word in a claim.

What is claimed is:

1. An apparatus, comprising:
   a processor; and
   a memory that stores executable instructions that, when executed by the processor, facilitate performance of operations, comprising:
      selecting index information corresponding to a resource element mapping pattern of a group of resource element mapping patterns, wherein the group of resource element mapping patterns is associated with a mobile device of a group of mobile devices, and wherein the index information is an index of a group of indices associated with respective ones of the group of resource element mapping patterns; and
      in response to the selecting the index information, transmitting, via signaling of a physical layer of a network with which the apparatus is associated, the index information to the mobile device to inform the mobile device of a control channel symbol location at which data is transmitted.

2. The apparatus of claim 1, wherein the resource element mapping pattern is a two-dimensional mapping pattern that comprises a first bit value indicative of the data transmitted at a first control channel symbol location and a second bit value indicative of the data failing to be able to be transmitted at the first control channel symbol location.

3. The apparatus of claim 1, wherein the selecting the index information comprises selecting a first value at a first time and selecting a second value at a second time.

4. The apparatus of claim 1, wherein the resource element mapping pattern further comprises symbol information indicative of a control channel symbol.

5. A method, comprising:
determining, by a mobile device coupled to a processor, index information identifying a resource element mapping pattern of resource element mapping patterns indicative of a downlink control channel symbol subcarrier location at which data is transmitted over a downlink channel to the mobile device, wherein the resource element mapping pattern is individualized to a unique identifier of the mobile device; and
determining, by the mobile device, whether to receive the data at the downlink control channel symbol subcarrier location based on an evaluation of a reception criterion.

6. The method of claim 5, wherein the evaluation of the reception criterion comprises the evaluation of whether the downlink control channel symbol subcarrier location is a location for transmission of a reference signal.

7. The method of claim 6, wherein the determining whether to receive the data comprises determining not to receive the data at the downlink control channel symbol subcarrier location indicated as available for the reception of the data based on a determination that the downlink control channel symbol subcarrier location is the location for the transmission of the reference signal.

8. The method of claim 5, wherein the evaluation of the reception criterion comprises the evaluation of whether the downlink control channel symbol subcarrier location is a location for a mobile device control channel symbol.

9. The method of claim 8, wherein the determining whether to receive the data comprises determining not to receive the data at the downlink control channel symbol subcarrier location indicated as available for the reception of the data based on a determination that the downlink control channel symbol subcarrier location is the location for the mobile device control channel symbol.

10. The method of claim 5, further comprising:
receiving, by the mobile device, the data at the downlink control channel symbol subcarrier location indicated as available for the reception of the data.

11. The method of claim 5, further comprising:
accessing, by the mobile device, the resource element mapping patterns, wherein the accessing is performed via a network device of a network to which the mobile device is communicatively coupled.

12. The method of claim 5, further comprising:
storing, by the mobile device, the resource element mapping patterns.

13. A non-transitory machine-readable medium, comprising executable instructions that, when executed by a processor, facilitate performance of operations, comprising:
determining index information identifying a resource element mapping pattern of resource element mapping patterns indicative of a downlink control channel symbol subcarrier location at which data is to be transmitted over a downlink channel to the mobile device, wherein the resource element mapping patterns for the mobile device are changeable over time resulting in a first resource element mapping pattern being selected for the mobile device at a first time and a second resource element mapping pattern being selected for the mobile device at a second time; and
determining whether to receive the data at the downlink control channel symbol subcarrier location based on an evaluation of a reception criterion.

14. The non-transitory machine-readable medium of claim 13, wherein the evaluation of the reception criterion comprises the evaluation of whether the downlink control channel symbol subcarrier location is a location for transmission of a reference signal.

15. The non-transitory machine-readable medium of claim 14, wherein the determining whether to receive the data comprises determining not to receive the data at the downlink control channel symbol subcarrier location indicated as available for the reception of the data based on a determination that the downlink control channel symbol subcarrier location is the location for the transmission of the reference signal.

16. The non-transitory machine-readable medium of claim 13, wherein the evaluation of the reception criterion comprises the evaluation of whether the downlink control channel symbol subcarrier location is a location for a mobile device control channel symbol.

17. The non-transitory machine-readable medium of claim 16, wherein the determining whether to receive the data comprises determining not to receive the data at the downlink control channel symbol subcarrier location indicated as available for the reception of the data based on a determination that the downlink control channel symbol subcarrier location is the location for the mobile device control channel symbol.

18. The non-transitory machine-readable medium of claim 13, wherein the operations further comprise:
receiving the data at the downlink control channel symbol subcarrier location indicated as available for the reception of the data.

19. The non-transitory machine-readable medium of claim 13, wherein the operations further comprise:
accessing the resource element mapping patterns, wherein the accessing is performed via a network device of a network to which the mobile device is communicatively coupled.

20. The non-transitory machine-readable medium of claim 13, wherein the operations further comprise:
storing the resource element mapping patterns.

* * * * *